United States Patent [19]

Marwood et al.

[11] Patent Number: 4,758,999

[45] Date of Patent: Jul. 19, 1988

[54] SYSTOLIC ARCHITECTURES FOR SONAR PROCESSING

[75] Inventors: Warren Marwood; Allen P. Clarke, both of Adelaide, Australia

[73] Assignee: The Commonwealth of Australia, Canberra, Australia

[21] Appl. No.: 903,573

[22] PCT Filed: Dec. 3, 1985

[86] PCT No.: PCT/AU85/00303

§ 371 Date: Aug. 4, 1986

§ 102(e) Date: Aug. 4, 1986

[87] PCT Pub. No.: WO86/03595

PCT Pub. Date: Jun. 19, 1986

[30] Foreign Application Priority Data

Dec. 3, 1984 [AU] Australia .................... PG8396

[51] Int. Cl.$^4$ .............................................. G01S 3/80
[52] U.S. Cl. ................................... 367/121; 367/119; 364/516
[58] Field of Search .............................. 367/118–124; 364/516; 371/8, 11

[56] References Cited

FOREIGN PATENT DOCUMENTS 8404225 10/1984 Australia .

OTHER PUBLICATIONS

Ward et al., "Application of a Systolic Array to Adaptive Beamforming", IEE Proceedings, vol. 131, No. 6, Oct. 1984, pp. 638–645.
Kung, "Special-Purpose Devices for Signal Image Processing: An Opportunity in Very Large Scale Integration (VLSI)", May 1984, pp. 76–84.
McCabe et al., "New Algorithms and Architectures for VLSI", 1982, pp. 68–75.

Primary Examiner—Thomas H. Tarcza
Assistant Examiner—Daniel T. Pihulic
Attorney, Agent, or Firm—Cushman, Darby & Cushman

[57] ABSTRACT

A three-dimensional systolic architecture for beamforming according to convolve signals from an array with sets of weighting coefficients using a one dimensional array of similar modules with finite impulse response filter elements with outputs directed into pipelining register stacks and propagated to the stack boundaries for summing in accumulator arrays and demultiplexing.

9 Claims, 7 Drawing Sheets

$$\begin{bmatrix} \underline{x}_1^T \\ \underline{x}_2^T \\ \vdots \\ \underline{x}_k^T \end{bmatrix} \otimes \begin{bmatrix} \phantom{o} & & o \\ & \ddots & \\ o & & \phantom{o} \end{bmatrix} = \begin{bmatrix} - \\ \phantom{x} - \\ \phantom{x} \end{bmatrix}$$

$x(t)$     $S(\theta)$     $B(\theta) = T_r(x \otimes S(\theta))$
              $= T_r(x \cdot S(\theta))$ A BEAM SAMPLE IS GIVEN BY THE TRACE OF A MODIFIED MATRIX PRODUCT WHICH GIVES ONLY THE DIAGONAL ELEMENTS OF THE PRODUCT.

OPERATION COUNT —: $k^2$ MULTIPLICATIONS
         $k-1$ ADDITIONS.

NUMBER OF ELEMENTS : $k^2 + k$.

CLOCK CYCLES PER BEAM SAMPLE : 1.

FIG. 5

$$\begin{bmatrix} \underline{x}_1(t+1) \\ \underline{x}_2(t+1) \\ \vdots \\ \underline{x}_k(t+1) \end{bmatrix} \oplus \begin{bmatrix} \underline{x}_1^T(t) \\ \underline{x}_2^T(t) \\ \vdots \\ \underline{x}_k^T(t) \end{bmatrix} = \begin{bmatrix} \underline{x}_1^T(t+1) \\ \underline{x}_2^T(t+1) \\ \vdots \\ \underline{x}_k^T(t+1) \end{bmatrix}$$

$k \times 1$      $k \times k$      $k \times k$

|  | $t$ | $t+1$ | $t+2$ | $t+3$ | $t+4$ |
|---|---|---|---|---|---|
| SPE 1 | $a_0 x(t)$ | $a_0 x(t)$ + $a_1 x(t+1)$ | $a_0 x(t)$ + $a_1 x(t+1)$ + $a_2 x(t+2)$ → | $a_0 x(t+3)$ | $a_0 x(t+3)$ + $a_1 x(t+4)$ |
| SPE 2 |  | $a_0 x(t+1)$ | $a_0 x(t+1)$ + $a_1 x(t+2)$ | $a_0 x(t+1)$ + $a_1 x(t+2)$ + $a_2 x(t+3)$ → | $a_0 x(t+4)$ |
| SPE 3 |  |  | $a_0 x(t+2)$ | $a_0 x(t+2)$ + $a_1 x(t+3)$ | $a_0 x(t+2)$ + $a_1 x(t+3)$ + $a_2 x(t+4)$ → |

FIG. 8

SYSTOLIC ARCHITECTURES FOR SONAR PROCESSING

BACKGROUND AND SUMMARY OF THE INVENTION

Current sonar systems employ both time and space diversity to achieve a high level of operational performance. This, together with the complex geometry and relatively slow speed of sound propagation in the ocean, has imposed many constraints on the concomitant signal processing system. For example, low sonar operating frequencies and the use of wide-band processing have forced the use of broad-band beamforming. Further, ever-increasing numbers of hydrophonic elements are being used for high spectral resolution and the signal processing system must be capable of forming in parallel large numbers of independent beams in order to attain an adequate angular cover as well as giving the desired spectral resolution. In addition, for towed systems in particular, the geometry of the array may fluctuate. The general effect of these three observations is to impose an enormous computing load on the signal processing system. Some agencies have developed satellite-to-shore systems which can call on the number crunching power of super-computers like the Cray. In the general environment this is not possible, and hence parallel computers based on VSLI technology must be considered. If such systems are realisable, then there is the added advantage that the system can be carried on small platforms such as helicopters and diesel-electric submarines.

This invention indicates one possible architecture for implementing a limited class of passive broad-band beamformers. It is found that computing loads approaching hundreds of mega-flops can be achieved conceptually with a minimum of silicon area. It is also found that the systems can be made highly reliable by incorporating a limited form of self repair.

A paper by Speiser, J. M., Whitehouse, H. J. and Bromley, K. (1980). 'Signal Processing Applications for Systolic Arrays', Record of the 14th Asimolar Conference on Circuits, Systems and Computers, Pacific Grove, Calif., IEEE 80CH1625-3 addresses the general question but does not give a clear indication of the power of systolic arrays for particular tasks. In contrast, this paper is concerned with a specific design and implementation.

Reference may be had to the specification of Patent Application No. WO 84/04225, published under the provision of the Patent Cooperation Treaty, in which a self repair large scale integrated circuit is described, this application is assigned to the Commonwealth of Australia, having the same inventors as this application namely Marwood, W. and Clarke, A. P.

The invention deals generally with a form of distributed signal processing called a systolic array. The systolic array is a one, two or higher dimensional array of identical processors. In each processor, both the hardware and the executed program is identical. Each processor is connected to nearest neighbours, computes data, and then passes data on to its neighbours at all times in synchronism with a master clock. In physiology, the word 'systole' is used for the heart contraction pumping blood. In the systolic array the system clock is the analogue of the heart.

In most sonar signal processing requirements, the basic operations can be written in a matrix form. When this is realised, it can be seen that each processor can consist of a cascaded sequence of processing blocks where each block is a systolic array executing a matrix operation. Hence the total implementation will consist almost entirely of systolic processing elements. Reference may be had to the papers of Whitehouse, H. J. and Speiser, J. M., 'Sonar Applications of Systolic Array Technology', presented at IEEE Eascon, Washington, D.C., Nov. 17–19, 1981, and Speiser, J. M. and Whitehouse, H. J., 'Parallel Processing Algorithms and Architectures for Real-Time Signal Processing', SPEE Vol. 298, Real-Time Signal Processing IV (1981) paper 298-03.

In conventional beamforming, the observation of some propagating, coherent wave in the ambient noise background of the ocean is enhanced by summing time-delayed and weighted hydrophone data. The weights are designed to achieve some specified side-lobe level from a particular array.

The output in a given direction $\theta$ is given $$b_\theta(t) = \sum_{n=2}^{k} w_n x_n(t - \tau_n(\theta)) \qquad (3.1)$$

where
- $x_n(t)$ is output from hydrophone n
- $w_n$ is a weight factor
- and $\tau_n(\theta)$ is a time delay to be applied to the $n^{th}$ hydrophone to steer in the direction $\theta$.

In digital systems the $x_n$ are sampled (usually at frequencies 5–10 times Nyquist) and samples from each hydrophone taken as near to the steered direction $\theta$ as possible.

BRIEF DESCRIPTION OF THE DRAWINGS

In order, however, that the invention will be better understood, an embodiment of the invention will be described with reference to the accompanying drawings, in which.

DESCRIPTION OF THE PREFERRED EMBODIMENTS

Figure 1:
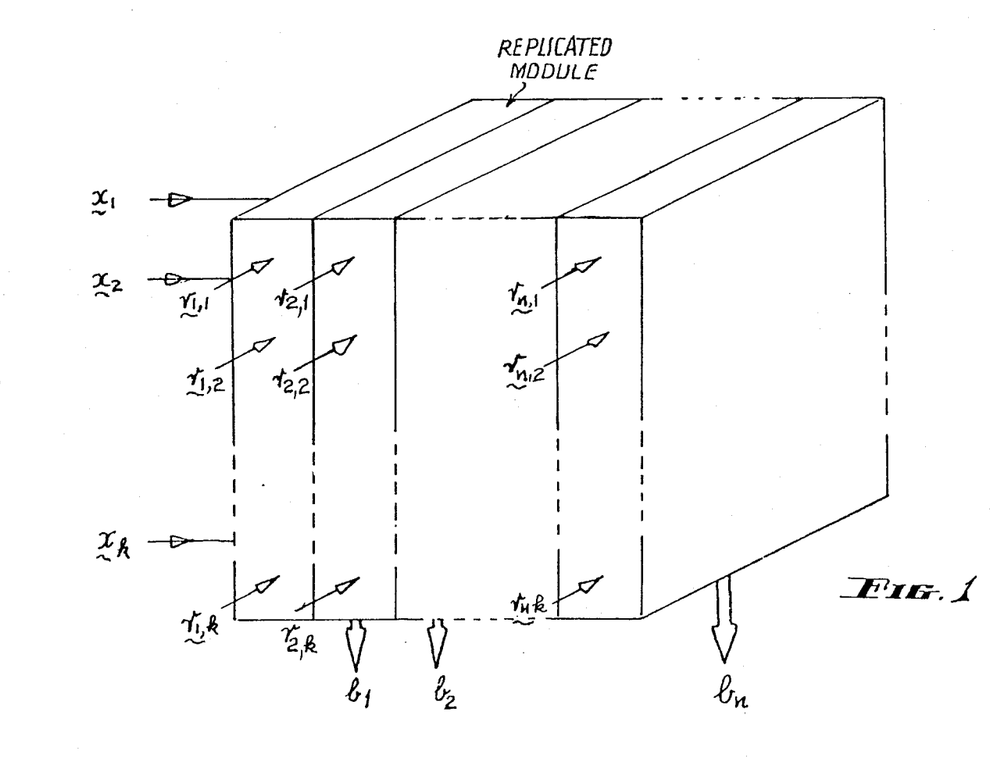
FIG. 1 shows a structural schematic of the beamformer which includes a linear concatenation of identical modules with sensor data input at the left boundary module and weighting coefficients input to the front boundary of each module and beam data output from the bottom face of each module.

FIG. 1 shows a structural schematic of the object of this invention, which is an interpolation or adaptive beamformer. The figure shows that construction is achieved by concatenating a series of identical modules 1. Sensor data are input at the leftmost module and weighting coefficients are input to the front boundary of each module. Beam outputs are driven out from the bottom face of each module, one beam per module.

Figure 2:
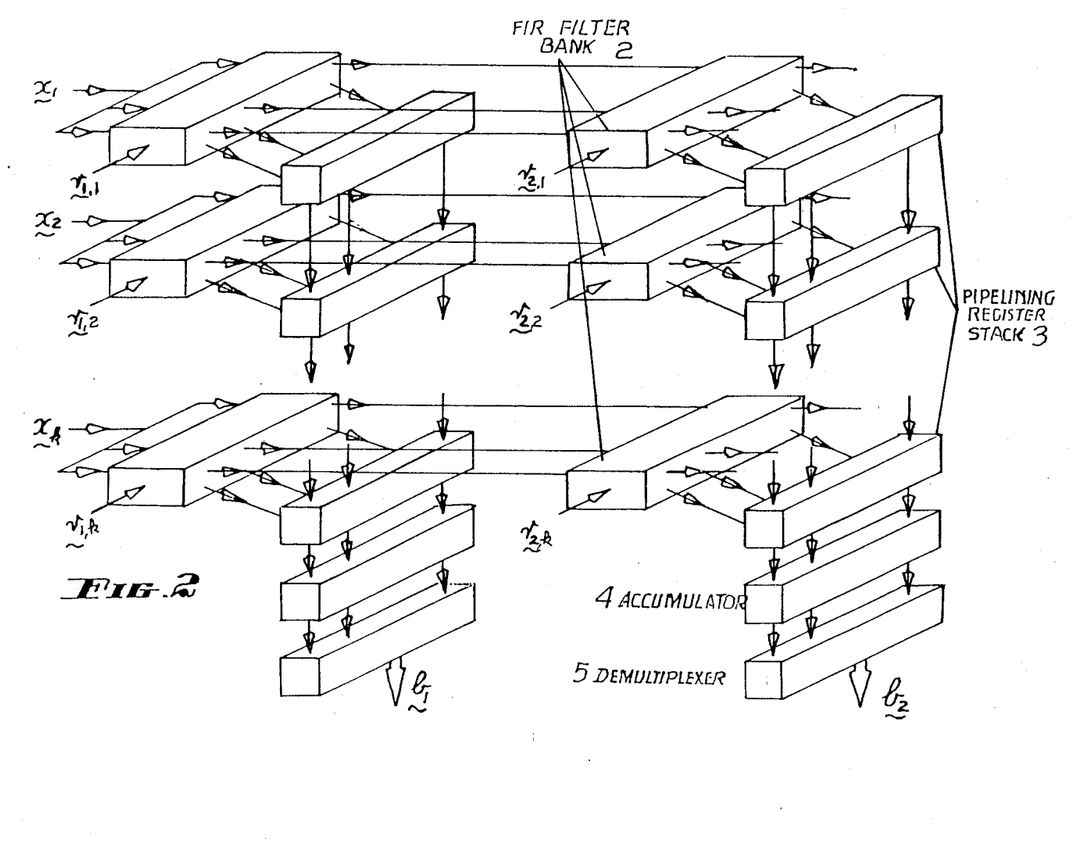
FIG. 2 shows a functional schematic of two modules and details their interconnection.

A block schematic of the beamformer is shown in FIG. 2 for the case of two beams. It is constructed by replicating modules designated by 2, 3, 4 and 5. The number of replications of the module determines the number of beams the beamformer can process. Module interconnection is demonstrated by the figure. Operation of the beamformer is described in terms of one module only. The FIR filter bank 2 is constructed from k linear systolic arrays of multiply/accumulate elements. Each systolic array implements an FIR filter. Each filter is associated with one particular sensor.

The number of FIR filters is determined by the number of sensors, and each sensor broadcasts its data to one systolic array per module. Weighting coefficients are entered serially into the boundary elements of each filter and recirculated. Filter outputs occur cyclically from each element in turn and are input to adjacent linear arrays of registers. These registers are interconnected orthogonally to form a pipelining register stack 3. Data is clocked through the structure synchronously, and the cyclic completion times of the k filters are in phase. This causes the outputs from the ith element of each of the k filters to be loaded synchronously into one column of the register stack 3 at each successive time period. These output samples are clocked through the register stack 3 to the accumulator bank 4 where the accumulated result is output after k clock periods. The skewing of the data present in the columns due to the cyclic behaviour of the filters cause the accumulator element outputs to be cyclic also. These outputs are input to a demultiplexer 5 to recover the correct beam time series.

The inputs are designated $X_1, X_2, X_3 \ldots X_k$ and these go to the FIR filter banks 2. The weights are indicated by $r_{1,1}, r_{1,2} \ldots r_{1,k}, r_{2,2} \ldots r_{2,k}$ etc.

Figure 3:
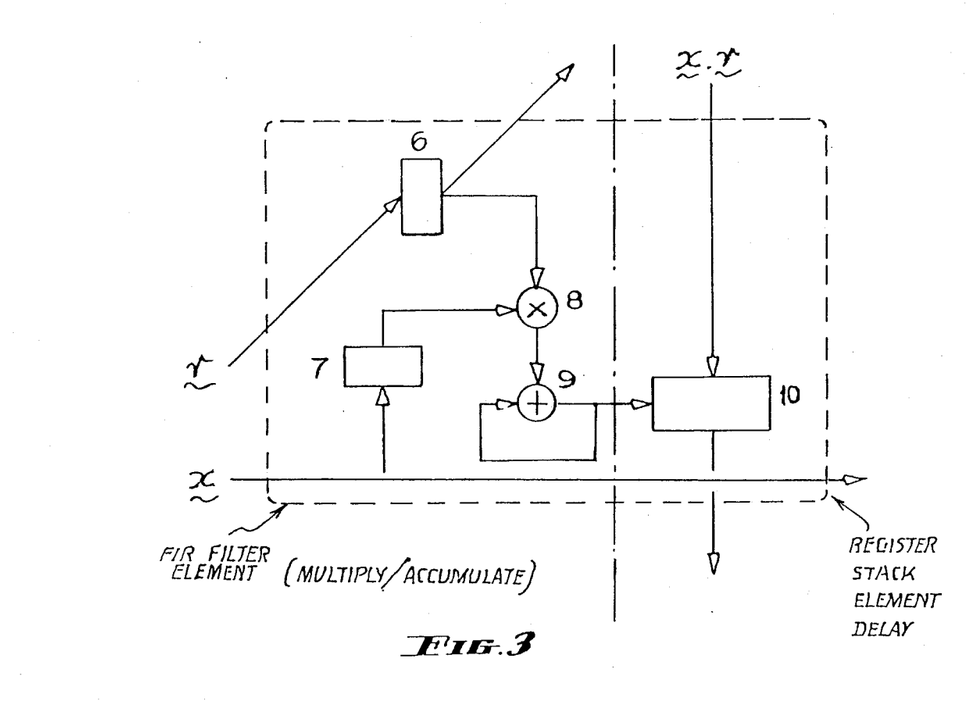
FIG. 3 is a functional schematic of a systolic processing element which when connected in a three dimensional structure of the form of FIG. 2 implements the FIR filter and register stacks of each module.

FIG. 3 shows a functional schematic of a systolic processing element which when connected in a three dimensional structure of the form of FIG. 2 implements the FIR filters 2 and register stacks 3 of the modules of FIGS. 1 and 2. It consists of a pipelining delay element 6 for the r coefficients and a storage delay element 7 for the x coefficients. These coefficients are multiplied in a multiplier element 8 and the result summed in an accumulator 9. At the completion of the formation of an inner product $x \cdot r$ in the accumulator it is loaded into a register stack element 10.

Figure 4:
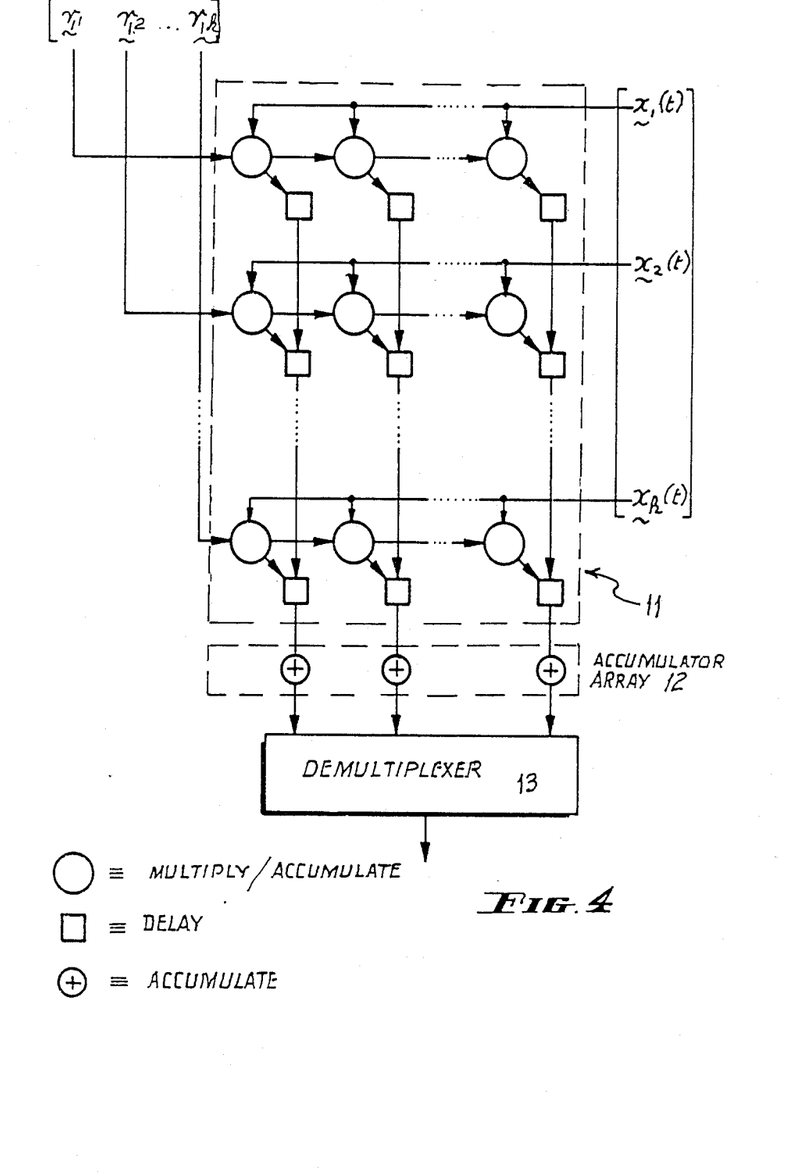
FIG. 4 shows the logical interconnection of a two dimensional array of the systolic elements of FIG. 3 to implement one module.

FIG. 4 shows the logical interconnection of a two dimensional array 11 of the systolic elements of FIG. 3 with an accumulator array 12 and demultiplexer 13 to implement one module of FIGS. 1 and 2.

The beamforming can be represented in matrix form as:

$$tr\{X \cdot S(\theta)\} = b_\theta(t)$$

where X is the data buffer at time t and $S(\theta)$ is a matrix that extracts data from X for summing.

Errors are possible due to sampling. Pridham, R. G., and Mucci, R. A., 'A Novel Approach to Digital Beamforming' I. Acoust, *Soc. Am.*, February 1978 pp 625–434 suggest interpolation as a means of reducing this error. For steering over p angles it is then possible to write a matrix equation $$\begin{bmatrix} b_1 \\ b_2 \\ \cdot \\ \cdot \\ \cdot \\ b_p \end{bmatrix} = \begin{bmatrix} r_1(\theta_1) & r_2(\theta_1) & \ldots & r_k(\theta_1) \\ r_1(\theta_2) & r_2(\theta_2) & \ldots & r_k(\theta_2) \\ \cdot & \cdot & & \cdot \\ \cdot & \cdot & & \cdot \\ \cdot & \cdot & & \cdot \\ r_1(\theta_p) & r_2(\theta_p) & \ldots & r_k(\theta_p) \end{bmatrix} \circledcirc \begin{bmatrix} x_1 \\ x_2 \\ \cdot \\ \cdot \\ \cdot \\ x_k \end{bmatrix} \quad (3.2)$$

where $r_1, r_2, \ldots, r_k$ are the k columns of S which are now occupied by interpolation coefficients, $x_1, x_2, \ldots, x_k$ are the k rows of X and ⊙ is an operation giving as the 'inner product' the sum over n of the scalar product $r_n \cdot x_n$ The formation of a single beam is considered $$b_1(\theta_1) = \sum_{i=1}^{k} r_i(\theta_1) \cdot x_i = \sum_{i=1}^{k} \sum_{j=1}^{s} r_{i,j}(\theta_1) x_{i,j}$$

where s is the length of the data vector.

A modification to this architecture which removes the necessity to broadcast the input data involves the placement of delay elements in both SPE interconnection paths and also the input data path.

Figure 5:
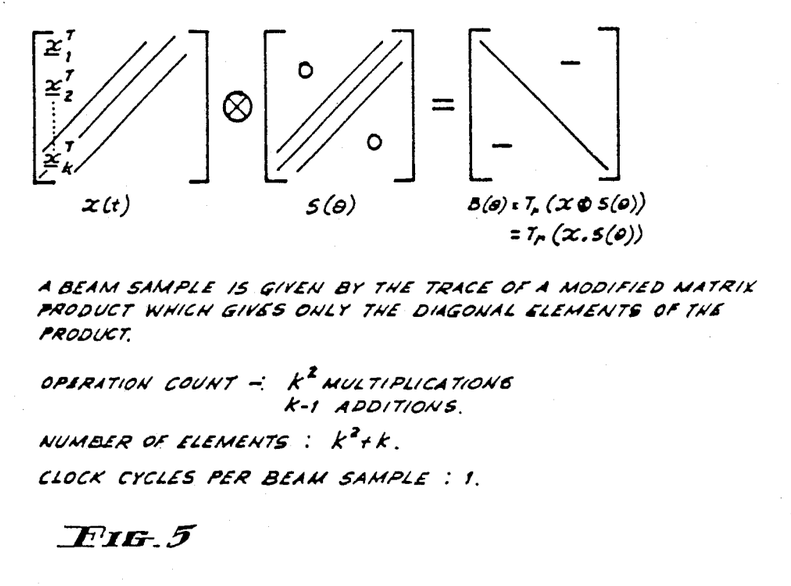
FIG. 5 shows the modified matrix product required for the formation of a beam sample.

FIG. 5 shows a schematic of the formation of an interpolation beam sample from a data matrix. The beam sample is the trace of the product of the data matrix and a weight matrix. As is shown in the figure, the computation performed by the proposed architecture does not include off-diagonal elements. The computation efficiency is improved over a conventional matrix multiplication by a factor of $(k-1)$, as only k elements are formed, compared to $k^2$ in the conventional product. The formation of the actual beam sample requires the addition of the k main diagonal elements. This involves $k-1$ additions.

Figure 6:
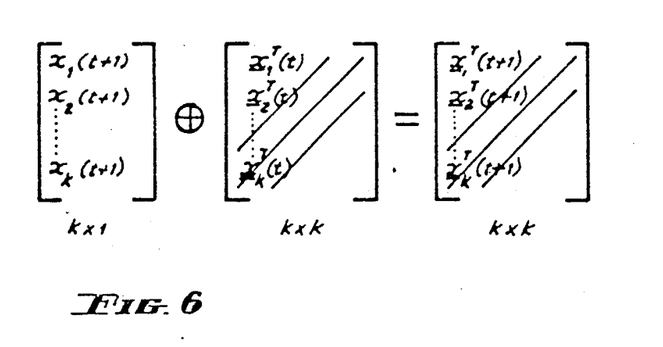
FIG. 6 indicates the data shift operation required at each array sample time.

To obtain the next beam sample, it is necessary to perform the data shift operation detailed in FIG. 6 before performing the modified matrix product. However, the structure of the systolic arrays which perform the convolutions make this data shift naturally. The architecture readily accepts adaptive processes such as the Frost algorithm.

In the case of an adaptive algorithm implementation, the coefficients are updated as often as is required. Computation of the new coefficients is performed externally to the systolic array.

Figure 7:
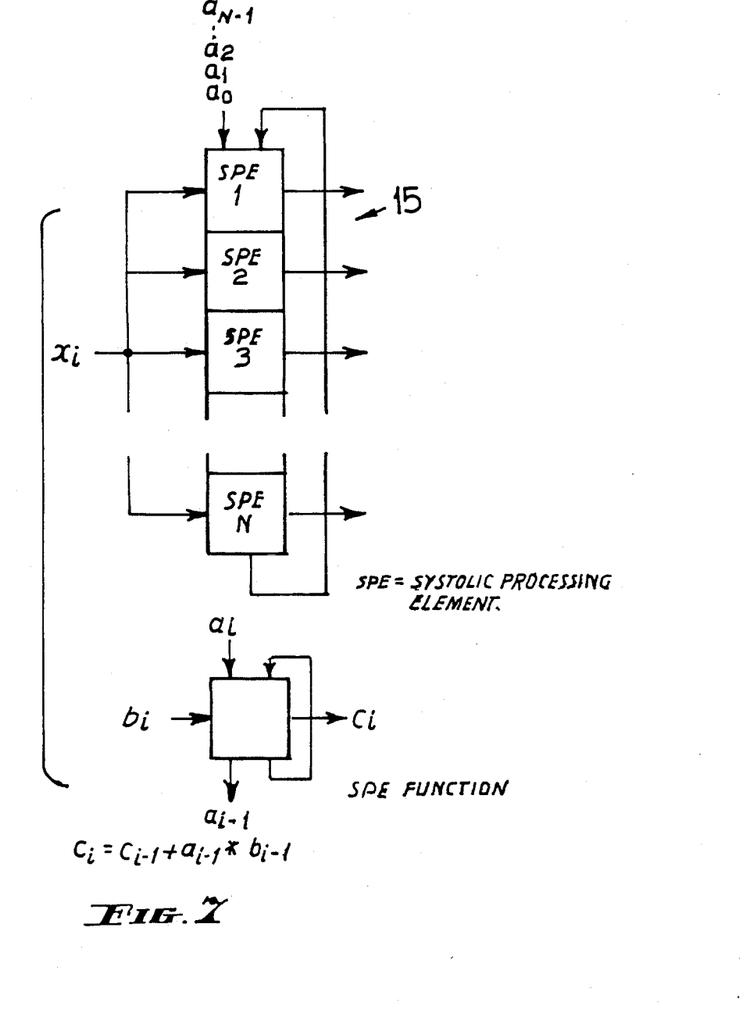
FIG. 7 shows by way of explanation the block diagram of a finite impulse response filter implemental with the systolic elements of FIG. 3.
Figure 8:
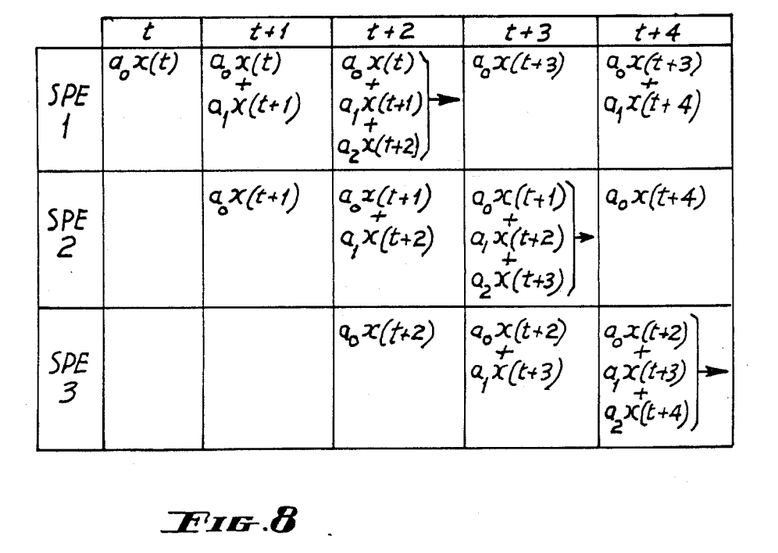
FIG. 8 shows for explanatory purposes, details of a third order finite impulse response (FIR) filter or convolution implementation, showing the cyclic completion behaviour of the systolic processing elements.

FIGS. 7 and 8 show respectively how a finite impulse response filter 15 is implemented with the systolic element of FIG. 3, and how the cyclic completion behaviour of the systolic elements is arrived at. The cyclic completion of the SPE's is not resolved by a demultiplexer as would be necessary in a complete filter implementation. Instead, advantage is taken of the spare clock periods between the completion phase of each SPE to clock the data in the pipeline register stack to the accumulator where it is summed.

The claims defining the invention are as follows:
We claim:

1. A three-dimensional systolic architecture for beamforming, arranged to accept broadcasted data samples from an array and to convolve said data samples with sets of weighting coefficients, said architecture being formed of a one dimensional array of similar modules, each comprising:
   at least one finite impulse response or FIR filter element;
   a plurality of pipelining register stacks receiving outputs of said at least one FIR elements and propagating said outputs to boundaries of said register stacks;
   accumulator arrays for summing said outputs at said stack boundaries; and
   demultiplexers, receiving the summed outputs and passing the outputs to beamformer output ports.

2. A three-dimensional systolic architecture according to claim 1 wherein each said FIR filter is adapted to connect to one sensor to receive said broadcast data samples therefrom, whereby each sensor broadcasts its data to one systolic array per module.

3. A three-dimensional systolic architecture according to claim 1 wherein said FIR filter element comprises a pipelining delay element receiving weighting coefficients and a storage delay element for x coefficients, a multiplier element, an accumulator, and a register stack, wherein said pipelining delay element and said storage delay element are arranged to output to said multiplier element which forms a product of said weighting coefficients times said x coefficients, and outputs the product to the accumulator from where said product is loaded into said register stack.

4. A three-dimensional systolic architecture according to claim 1 arranged to further comprising means for recirculating the weighting coefficients to allow the beam former to accept sensor inputs and compute beam outputs without continuous entry of weighting information.

5. A three dimensional systolic architecture according to claim 2 wherein said circuitry includes FIR filter elements which are incompletely implemented, whereby accumulation of the result can occur during spare clock periods.

6. A three dimensional systolic architecture according to claim 1, wherein a number of said replicated modules used equal a number of beamformers required, and the FIR filter bank is constructed from linear systolic arrays of multiply/accumulator elements and each systolic array implements one said FIR filter of the filter bank and each filter is associated with one particular sensor, further characterized in that each sensor broadcasts its data to one systolic array per module (1) and comprising means for serially entering weighting coefficients into the boundary elements of each filter of the filter bank and recirculated, the outputs of said filter banks being arranged to occur cyclically from each element in turn and are directed to input to adjacent linear arrays of registers which are interconnected orthogonally to form a pipelining stack.

7. A three dimensional systolic architecture according to claim 6 further comprising means for synchronously clocking data through the structure such that cyclic completion times of the elements of the filter banks are in phase, whereby the completed convolution sums are loaded synchronously into one column of the register stack at each successive period of time and the outputs are input to the said demultiplexer to recover a correct beam time series.

8. The method of data collection using a three-dimensional systolic architecture, comprising the steps of:
   (a) collecting information on transducers such as hydrophones to produce a signal, and passing the signal of each transducer to an array of similar modules as a signal input;
   (b) passing the signal input to each module to a linked FIR filter bank having finite impulse response filter elements, to produce a signal output;
   (c) passing the signal output from the filter bank to a pipelining register stack; and
   (d) accumulating and demultiplexing in an accumulator and a demultiplexer to form a beam whereby a series of beams are produced.

9. The method of data collection according to claim 8 wherein the said FIR filter banks are incompletely implemented.

* * * * *